United States Patent
Kurby et al.

(10) Patent No.: US 11,415,701 B2
(45) Date of Patent: Aug. 16, 2022

(54) TRUSTED SIGNAL ACQUISITION IN POSITIONING SYSTEM RECEIVERS

(71) Applicant: iPosi, Inc., Denver, CO (US)

(72) Inventors: Christopher Neil Kurby, Streamwood, IL (US); Eric Derbez, Vancouver (CA); Derek Glass, Lafayette, CO (US)

(73) Assignee: iPosi, Inc., Denver, CO (US)

( * ) Notice: Subject to any disclaimer, the term of this patent is extended or adjusted under 35 U.S.C. 154(b) by 585 days.

(21) Appl. No.: 16/356,720

(22) Filed: Mar. 18, 2019

(65) Prior Publication Data

US 2019/0293802 A1 Sep. 26, 2019

Related U.S. Application Data

(60) Provisional application No. 62/647,321, filed on Mar. 23, 2018.

(51) Int. Cl.
*G01S 19/21* (2010.01)
(52) U.S. Cl.
CPC .................. *G01S 19/215* (2013.01)
(58) Field of Classification Search
CPC ............... G01S 19/215; G01S 19/235
See application file for complete search history.

(56) References Cited

U.S. PATENT DOCUMENTS

| | | | |
|---|---|---|---|
| 9,124,356 B2 * | 9/2015 | Gunawardena | G01S 19/30 |
| 10,514,465 B2 * | 12/2019 | Namineni | G01S 19/215 |
| 10,557,944 B2 * | 2/2020 | Wu | G01S 19/23 |
| 2020/0371247 A1 * | 11/2020 | Marmet | G01S 19/015 |

FOREIGN PATENT DOCUMENTS

WO WO-2012007720 A1 * 1/2012 .......... G01S 19/215

\* cited by examiner

*Primary Examiner* — Cassi J Galt
(74) *Attorney, Agent, or Firm* — Holzer Patel Drennan

(57) ABSTRACT

Approaches for detecting and/or rejecting fraudulent positioning system signals at one or more positioning system receivers. The receivers may establish a time search window that may be maintained beyond a time in which a fraudulent signal is expected to move away from an authentic signal a sufficient amount so as to fall outside the time search window. Various approaches are described for updating the time signal at the receiver to maintain accuracy without acquiescing to the introduced bias of a fraudulent signal. Also, an approach for evaluation of candidate signals for consistency at one or more stationary receivers is described. Also, approaches for collective evaluation of signals provided from networked receivers are described to provide sentry receivers operative to detect and alert the presence of a fraudulent signal.

14 Claims, 11 Drawing Sheets

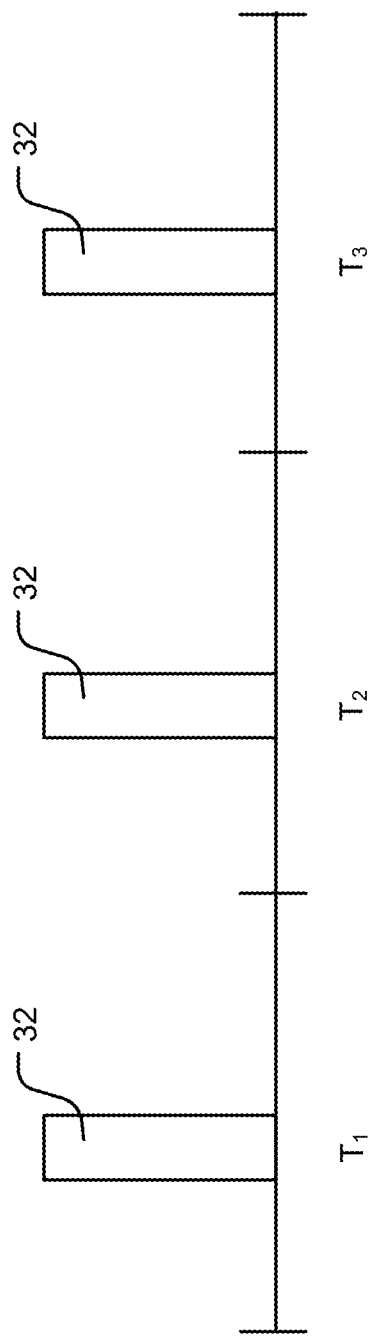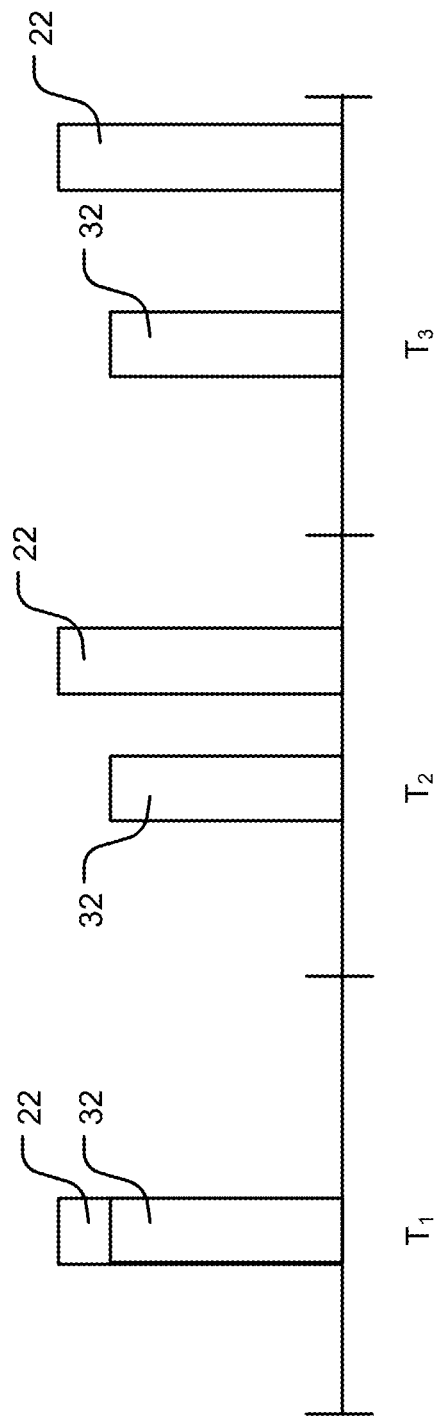

TRUSTED SIGNAL ACQUISITION IN POSITIONING SYSTEM RECEIVERS

RELATED APPLICATIONS

This application is a non-provisional of and claims priority to U.S. Application No. 62/647,321 entitled "TRUSTED SIGNAL ACQUISITION IN POSITIONING SYSTEM RECEIVERS", which was filed on Mar. 23, 2019, the entirety of which is incorporated by reference herein.

FIELD

The present disclosure generally relates to techniques for reception of positioning system signals at a receiver, and in particular to improved acquisition of trusted signals and/or recognition of falsified signals at the receiver.

BACKGROUND

The use of positioning system receivers has become common in a number of important applications. Such applications may require precise location and/or timing that may be derived using positioning system receivers. For instance, the use of a Global Navigation Satellite System (GNSS) such as GPS or the like may provide important information to receivers such as the location of the receiver. In addition, a GNSS receiver may be operative to resolve an accurate time based on receipt of GNSS signals. Other positioning systems may similarly provide important information regarding position and/or time such as, for example, LORAN, DME, or other positioning systems. The security of such systems becomes a concern because such positioning systems are often relied on as a source of highly precise position and/or time for critical applications related to infrastructure, security, safety, or the like.

As the use of positioning systems has become more prevalent, it has been recognized that positioning systems (e.g., any GNSS including GPS) may be vulnerable to spoofing attacks in which a receiver may receive falsified signals such that the receiver arrives at a false position and/or time solution. The result of such spoofing attacks may impact many industries or applications that require very precise time (e.g., less than about 1 µs time accuracy) such as, for example, banking, stock trading, electrical infrastructure systems, telecommunication systems, or the like. Furthermore, precise location systems that utilize ground-based timing may require timing accuracy to less than about 100 ns. Given the precision required in such applications, positioning system receivers may be relied upon to provide accurate position and/or time solutions, yet such receivers may be spoofed to interrupt or interfere with such applications.

Specifically, GPS spoofing attacks often occur by a malicious actor or "spoofer" broadcasting a replica of a GPS signal at a higher power than an GPS authentic signal. The replica signal may initially align with the authentic GPS signal, yet due to the higher power at which the replica signal is broadcast, the receiver may begin to track the replica signal rather than the authentic signal. Accordingly, over time, the spoofer may modify the replica signal such that the signal is falsified and moves away (or "walks") from the authentic signal. Given the falsified or "spoofed" replica signal may be at a higher power than that of the authentic, a receiver may continue to track the spoofed signal due to the higher signal power. If the receiver tracks the spoofed signal, a resulting position and/or time derived by the receiver may become corrupted or falsified by the spoofer. This type of attack may be referred to as a "carry-off" attack.

Some approaches to mitigate the risk of GPS spoofing attacks have been proposed such as automatic gain control (AGC) monitoring. AGC monitoring generally attempts to identify a spoofed signal by recognizing an artificially high signal strength used by spoofers to divert a receiver in a carry-off attack. However, such systems typically rely on known or estimated signal strength values relative to freely propagated signals and may not be accurate or feasible to execute for receivers without a clear view of positioning system transmitters such as GPS satellites. Accordingly, in view of the increasing reliance on positioning system signals for position and/or time, and in view of the identified vulnerabilities to falsified signals, the need for a mechanism by which signals may be identified as falsified is needed.

SUMMARY

Accordingly, the present disclosure generally relates to disregarding, ignoring, or otherwise rejecting a falsified positioning system signal at a receiver. Specifically, the present disclosure includes discussion related to use of a time search window at a receiver to reject a falsified or "spoofed" positioning system signal. In this regard, the receiver may generate, receive, or otherwise access a time signal (e.g., a clock signal), which may relate to a local time base of the receiver and may comprise a nominal time signal that is used for operation of the receiver. A time search window may be established based on the time signal over which a search for positioning signals may occur. Generally, the search for positioning system signals may include an autocorrelation process that allows for a search over a given time search window by shifting a generated reference signal over the time search window to detect a correlation peak between the generated reference signal and signals received at an antenna of the receiver.

Specifically, it has been presently recognized that by establishing a sufficiently narrow time search window, falsified positioning system signals may be rejected at the receiver as the falsified signal may fail to produce a correlation peak relative to the reference signal within the time search window defined relative to a time signal at the receiver. That is, while a falsified or spoofed signal may originally align with an authentic positioning system signal, as the spoofer introduces intentional modification to the spoofed signal relative to the authentic, the spoofed signal will also shift in relation to the time search window. In this regard, a sufficiently large shift of the spoofed signal will result in the correlation peak of the signal falling outside the time search window. In turn, an authentic signal that may have a lower correlation peak due to a reduce power relative to the spoofed signal may be uncovered and acquired by the receiver as the authentic signal may still fall within the time search window.

Such an approach may assume that the receiver receiving the positioning system signals is stationary. That is, while movement of the receiver may result in a shift of the received positioning system signal relative to a time search window, assuming a receiver is stationary may remove any potential shift in signal based on movement of the receiver. Moreover, it may be that movement of the receiver may be minimal relative to a shift in the signal based on a spoofer's intentional adjustment of the signal. In this regard, even for receivers that are not stationary, but traveling at a relatively low velocity, a fraudulent signal may be rejected based on the correlation peak for the signal falling outside the time search window.

It has been found that the foregoing method of establishing a time search window to reject spoofed signals that are shifted to fall outside the time search window may be effective through use of a highly stable and precise oscillator for generation of the time signal at the receiver relative to which the time search window is established. However, in use such a highly stable and precise oscillator may not be practical or economically feasible. Rather, a receiver may have a more economic, less stable oscillator that requires periodic synchronization to a positioning system time base.

In this regard, a receiver may include a locally maintained nominal time reference from which the time signal may be generated. This locally maintained nominal time reference may be driven by a local oscillator that is subject to variation, thus requiring the nominal time reference to be periodically updated. The updating of the nominal time reference may be accomplished by synchronization to a positioning system time base based on received positioning signals. Alternatively, the updating of the nominal time reference may be accomplished by synchronization to an external time base based on a timing protocol communicated to the receiver. For instance, the timing protocol may be communicated to the receiver over an asynchronous packet-switched internet protocol network. While the timing protocol may allow for synchronization of the nominal time reference to a positioning system time base, the synchronization may be accomplished by communication over the asynchronous packet-switched internet protocol network without exclusive reliance on the receipt of positioning system signals at the receiver.

In relation to the updating of the nominal time reference based on received positioning system signals, care may be taken to avoid updating the nominal time reference using a time base that is corrupted from fraudulent positioning system signals. In this regard, it may be appreciated that a spoofer may alter a fraudulent signal at a given rate. For instance, an initially on-time mimic of an authentic signal may be gradually shifted by a spoofer at a rate of 70 ns/s. That is, the spoofer may introduce 70 ns of error into the fraudulent signal every second. Accordingly, the frequency at which the nominal time reference may be updated may be based on an anticipated or estimated rate of shift of a fraudulent signal. For example, a relatively long period between updates of the nominal time reference may be established such that the introduced error into the fraudulent signal may exceed a bound of the time search window prior to updating the nominal time reference based on received positioning signals. In an embodiment, the rate at which the nominal time reference is updated may be greater than 10 times the anticipated or estimated rate of shift of the fraudulent signal.

Alternatively, in the context of synchronization to an external time base based on a timing protocol, the timing protocol may be used to maintain synchronization to an external time base without reliance on positioning system signals susceptible to spoofing. In this regard, the communication with the receiver using the timing protocol may be hardened or otherwise protected (e.g., including encryption means or other mechanism for securely communicating over a network). However, reliance on such a timing protocol may be limited by network stability. That is, in a stable network (e.g., with stable characteristics for packets exchanged over the network related to the timing protocol such as predictable or low latency and low jitter), the timing protocol may provide a precise reference for a nominal time reference at the receiver. Accordingly, in one approach the nominal time reference may be disciplined to an external time base using the timing protocol and may be maintained separately from a GPS receiver clock such that resulting time calculations by the GPS receiver clock are compared to the nominal time reference that is to identify disparities that may result from a fraudulent GPS signal. Alternatively, the time search window may be defined relative to the nominal time reference disciplined to the external time base using the timing protocol. In this regard, if a fraudulent signal is manipulated so as to fall outside the time search window, the signal may be rejected or ignored. Moreover, the timing protocol may also be used in conjunction with periodic updates using positioning system signals. Specifically, the timing protocol may be used to assist in disciplining the nominal time reference between updates using the positioning system signals.

Further still, the present disclosure presents approaches to validation and/or rejection of positioning system signals that include reviewing alternative correlation peaks (e.g., other than the primary peak) in a Doppler bin for received signals to evaluate candidate signals corresponding to the alternative correlation peaks. That is, it may be the case that a spoofer broadcasts a signal at a power greater than an authentic signal in an attempt to have a receiver identify and track the higher power, but fraudulent, signal rather than the authentic signal. This may result in the fraudulent signal having a larger correlation value at the receiver. As such, it is contemplated herein to identify a plurality of correlation peaks (e.g., at least two) within a Doppler bin. In turn, the plurality of correlation peaks may correspond to candidate signals acquired at the receiver. The candidate signals may be observed (e.g., in relation to a solution using the signal or a characterization of the signal) to determine whether the candidate signal is authentic. For instance, if one candidate signal (e.g., the higher power signal corresponding to a primary correlation peak within a Doppler bin) when used to derive a position solution for the receiver results in an assumed stationary receiver being in motion while another candidate signal (e.g., a lower power signal corresponding to an alternative correlation peak within the Doppler bin) results in the stationary receiver remaining stationary when used for a position solution, the candidate signal that results in a solution agreeing with the assumed stationary nature of the receiver may be regarded as the authentic signal and the other candidate signal(s) may be rejected. In addition, the solution may relate to the phase offset derived during a time and/or frequency recover and signals that do not agree in relation to phase offset may be rejected. While such an approach may be used to reject a fraudulent signal broadcast at a power greater than an authentic signal, it may also be used to validate an authentic signal at a higher power than a fraudulent signal by evaluation of the respective candidate signals to determine a consistent solution (e.g., a solution corresponding to a stationary receiver) among the candidates. As will be described in greater detail below, this technique may be useful for spoofing attacks on time in the context of stationary receivers where the rate at which the fraudulent signal is modified (i.e., "walked off") is slow.

Still another approach described herein may involve a network of a plurality of receivers that may provide signals received at the plurality of receivers to allow for collective analysis of the signals to determine whether fraudulent signals are present among the signals provided by the plurality of receivers. In an embodiment, the network of receivers may comprise three or more receivers that are in operative communication over a local area network (LAN). While the plurality of receivers may be in operative communication over a LAN, the receivers may be separated by at least about 30 m. In other embodiments, the receivers that operatively communicate over the LAN may be separated by a distance of not less than about 150 m and not greater than about 300 m. This may allow for some amount of separation so that not all receivers may be targeted by a spoof attack, yet allow for sufficiently close receivers so as to receive the same common authentic signals from a positioning system.

Alternatively, the receivers may be in operative communication over a wide area network (WAN) such as the Internet. In the case of a wide area network, the receivers may be separated by potentially very large distances (e.g., over 1 km of separation between adjacent receivers). However, the practicality of a collective analysis of signals from receivers in a WAN may be limited by the common reception of signals from space vehicles. That is, the receivers may be near enough to one another to receive the same pseudorandom codes from the same space vehicles in the positioning system. However, receivers may still be separated by relatively large geographic distances and still receive common signals from a GPS space vehicle. For instance, in an embodiment the receivers may be separated by a distance of at least 1 km and not less than about 100 km.

Accordingly, if a spoofer attempts to attack less than all of the plurality of receivers, a resulting inconsistency may be identified from the collective analysis of the signals from the plurality of receivers. For instance, the receivers may be assumed to be stationary. In turn, any solution that indicates movement of a receiver (e.g., in an absolute relation to the Earth or relative to other receivers) may indicate reception of a fraudulent signal at least one of the plurality of receivers. Alternatively, a pseudorandom code from at least three or more space vehicles in the positioning system do not agree in phase or phase offset may be indicative of a spoof attack on at least one of the receivers.

If a spoof attack is detected among the receivers in the network, a number of actions may occur. For instance, an alert may be generated that may bring attention to the fact that a fraudulent signal is present. Such an alert may be provided to each receiver in the network. Additionally or alternatively, an alert may be shared outside the network. This may include communicating the alert to other receivers outside the network or authorities to allow for investigation of the source of the fraudulent signal. Furthermore, if a fraudulent signal is identified, the networked receivers may also undertake additional processing to identify authentic signals. This may include identifying candidate signals corresponding to alternative correlation peaks as described above. In this regard, the networked receivers may provide candidate signals that may be collectively analyzed to determine if a consistent solution may be identified from the candidate signals. For instance, candidate signals associated with correlation peaks at a lower power than a fraudulent signal may be identified and used for processing, thus allowing the fraudulent signal to be rejected. In this regard, the network may comprise stationary receivers. However, the network may also include mobile receivers. In this regard, the stationary receivers may allow for determination of fraudulent signals (e.g., by falsely indicating movement of an assumed stationary receiver). In turn, the mobile receivers in communication with the network may receive an indication of the presence of a fraudulent signal to assist in rejecting such a signal.

In view of the foregoing, it may be appreciated that receivers provided in accordance with the discussion provided herein may provide a sentry function that allows detection of fraudulent signals that may otherwise not be easily identifiable by mobile receivers alone. In this regard, a receiver operating as described herein may be referred generally as a sentry receiver, indicating the receiver is capable of detecting the presence of a fraudulent signal. Such sentry receivers may operation in isolation or a plurality of sentry receivers may be provided in the context of a network arrangement. For instance, in the context of the network arrangement, the sentry receivers may comprise less than all of the receivers communicating on the network. In any regard, use of one or more sentry receivers may facilitate a trusted network in which any attempts to spoof signals may be detected. In turn, the trust or reliability of the network may be improved or confirmed. That is, at a minimum, use of the sentry receivers may allow for an indication of a loss of trust of a network in the presence of a spoofing attack. As such, solutions derived using signals from receivers in the network may be verifiable as authentic by use of sentry receivers in the network. Such solutions may provide location and/or timing information for the network and/or receivers located therein. As such, as identified above, sensitive applications that are susceptible to interruption or corruption by spoof attacks may be hardened by utilization of sentry receivers as described herein.

Accordingly, a first aspect of the present disclosure includes a method for rejecting at least one falsified positioning system signal at a receiver. The method includes acquiring at least a first positioning system signal at the receiver. Specifically, the first position system signal is acquired based on a time search window defined relative to a time signal at the receiver. In turn, the first positioning system signal generates a correlation peak within the time search window. The method also includes rejecting at least a second positioning system signal at the receiver as a falsified positioning system signal based upon the falsified positioning system signal falling outside of the time search window relative to the time signal.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment, the method may further include accessing an assumed-correct time signal at the receiver corresponding to a first time base. The assumed-correct time signal is defined relative to the first time base. That is, the receiver may have a local oscillator that is the basis of the first time base. The first time base may have been, at least at some time, synchronized to an external time base such as Coordinated Universal Time (UTC) utilized by GPS.

In an embodiment, the assumed-correct time signal may be accessed from a locally maintained nominal time reference at the receiver. In this regard, the method may further include initializing the locally maintained nominal time reference at a first time by synchronization of the locally maintained nominal time reference relative to a positioning system time base. The initializing may include synchronization of the locally maintained nominal time reference using initial positioning system signals acquired at the first time, wherein the initial positioning system signals are assumed to be authentic. In turn, the method may include updating the locally maintained nominal time reference at a second time subsequent to the first time by synchronization of the locally maintained nominal time reference based on positioning system signals from the acquiring of the at least first positioning system signal at the receiver based on the time search window defined relative to the assumed-correct time signal. As it may be appreciated that the updating of the locally maintained nominal time reference may be corrupted by fraudulent signals, it is desirable to detect and/or reject fraudulent signals prior to use in the updating. Accordingly, given a spoofer may induce a rate of change of the signal in a walk-off attack, it may be advantageous to update the receiver at a sufficiently slow rate such that fraudulent signals may pass a boundary of the time search window prior to the update. As such, the updating may occur less frequently than the acquiring. Specifically, the updating may occur at a rate that is lower than an expected rate of drift of a falsified positioning system signal.

In another embodiment, the assumed-correct time signal may be an external time reference received at the receiver from a location remote from the receiver. The external time reference may correspond to a positioning system time of a positioning system that generates the positioning system signal. As such, the method may include obtaining the external time reference based on a protocol communicated to the receiver over an asynchronous packet-switched internet protocol network. Furthermore, the method may include deriving a calculated time signal from the at least first position system signal and comparing the calculated time signal to the external time reference. Accordingly, the comparing may be used to determine whether the at least first position system signal is authentic. Additionally or alternatively, the comparing may be used to provide a correction to the external time reference.

In an embodiment, the receiver may be stationary. Based on this fact, positioning signals received at the receiver may be analyzed to determine whether the signals are consistent with expected signal characteristics for a stationary receiver. For instance, a plurality of candidate signals may be identified in the time search window that correspond to identified correlation peaks within the time search window. In view of this, the method may further include analyzing each one of the plurality of candidate signals to determine whether a resultant solution using a given one of the plurality of candidate signals corresponds to an expected solution. The method may also include determining, based on an unexpected solution derived using the given one of the plurality of candidate signals, the given one of the plurality of candidate signals is a falsified positioning system signal.

The expected solution may relate to any one of a number of potential characteristics derived from the signals. For instance, the solution may comprise a position solution, and the expected solution may comprise an a priori location determined for receiver. Additionally or alternatively, the solution may comprise a phase offset for the time signal, and the expected solution may include an expected phase offset based on a time since a prior update and a recovered frequency error.

In relation to analysis of candidate signals, a first of the plurality of candidate signals and a second of the plurality of candidate signals may be identified in the time search window. The first of the plurality of candidate signals may be authentic and a second of the plurality of candidate signals may be falsified. In an embodiment, the power of first signal may be greater than the power of the second signal. However, in another embodiment, the power of the second signal may be greater than the power of the first signal.

A second aspect includes a method for network based identification of a fraudulent positioning system signal. The method includes connecting a plurality of receivers via a communications network and receiving positioning system signals at each of the plurality of receivers. The method also includes communicating at least one characteristic regarding the received positioning system signals to a comparator. In turn, the method includes comparing, at the comparator, the at least one characteristic form the received positioning system signals from each of the plurality of receivers and identifying an anomaly among the received positioning system signals based on the comparing. In turn, the method includes indicating receipt of a falsified positioning system signal based on the identified anomaly.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, the communications network may be an asynchronous packet-switched internet protocol network. In an embodiment, the communications network may be a local area network in which the plurality of receivers are separated by distance not less than 150 m and not greater than about 300 m. Alternatively, the communications network may comprise a wide area network in which the plurality of receivers are separated by a distance not less than 1 km and in which the plurality of receivers each receive at least one positioning system signal from the same positioning system transmitter.

In an embodiment, the method includes identifying, at each of the plurality of receivers, a plurality of candidate signals within a time search window at the receiver. Each of the plurality of candidate signals may be communicated to the comparator. In turn, the method may also include selecting from the plurality of candidate signals a subset of the plurality of candidate signals that provide a consistent solution using the subset of the plurality of candidate signals. For instance, the consistent solution may include an expected position of one or more of the plurality of receivers. The consistent solution may be an expected phase offset of one or more of the plurality of receivers. In turn, the selecting may include discarding at least one candidate signal from the plurality of candidate signals having a power greater than another of the plurality of candidate signals based on an identified anomaly with the discarded at least one candidate signal.

In an embodiment, the plurality of receivers may be stationary. The anomaly may include a phase disagreement of at least one of the positioning system signals. Moreover, the indicating may include generating an alert regarding a falsified positioning system signal. The method may in turn include communicating the alert to at least another receiver.

BRIEF DESCRIPTION OF THE FIGURES

FIG. 2 depicts a representation of authentic positioning system signals received at a receiver.

FIG. 3 depicts a representation of both an authentic and a fraudulent signal being received at a receiver with divergence between the signals over time.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
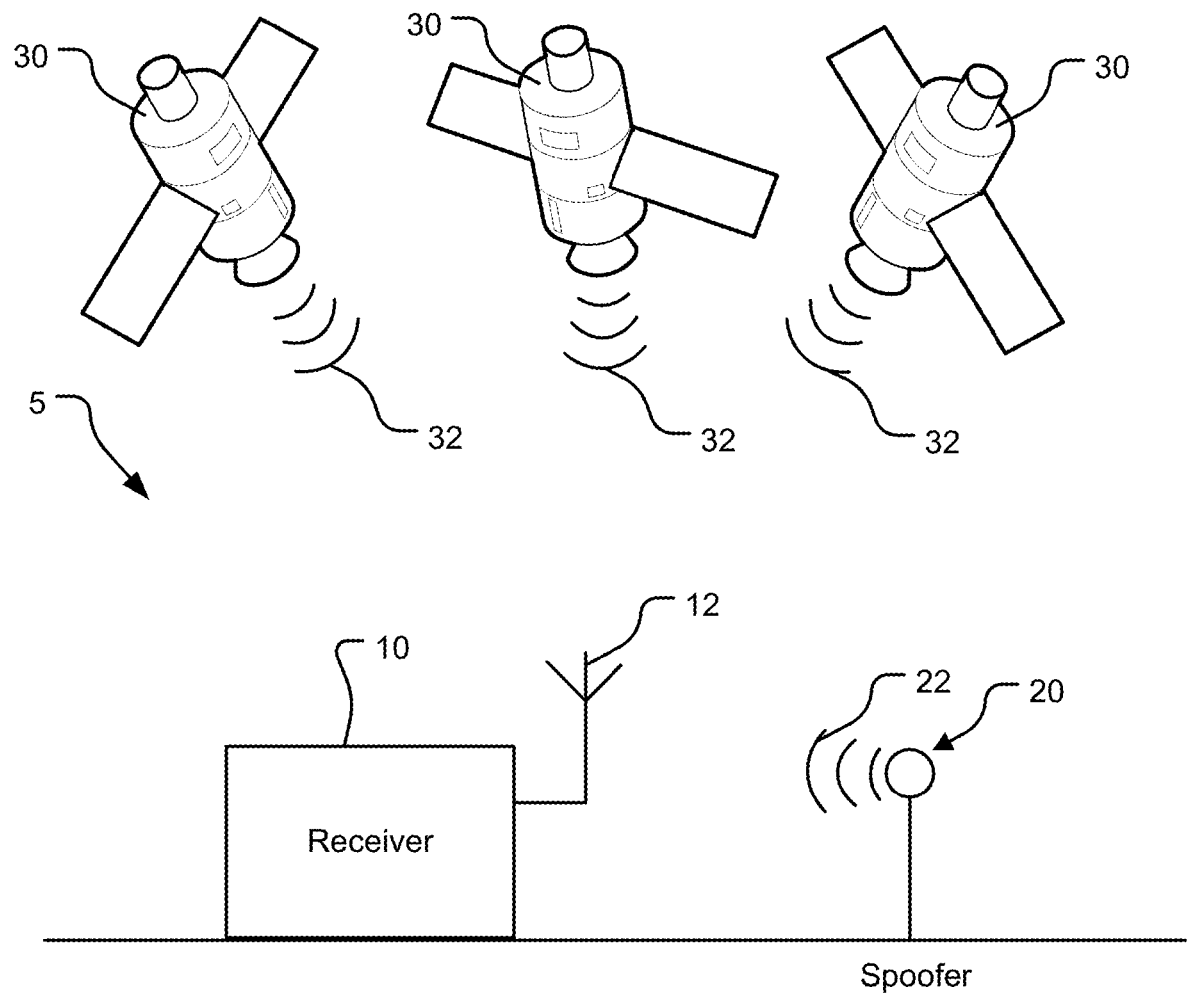
FIG. 1 depicts an embodiment of an environment in which a spoofing attack may occur.

FIG. 1 depicts an environment 5 in which a spoofing attach may take place. Specifically, a receiver 10 may be provided that may receive positioning signals 32 from a plurality of positioning system transmitters 30. In an embodiment, the positioning system may comprise a GNSS such as GPS or the like. In this regard, the positioning system transmitters 30 may comprise space vehicles capable of transmitting positioning signals 32 in the form of GPS signals. In any regard, the receiver 10 may comprise an antenna 12 for receipt of the positioning system signals 32.

Also in the environment 5 may be a spoofer 20 or malicious actor intent on deceiving the receiver 10. The nature of the attempted spoof attack may be for a number of purposes including, for example in an attempt to deceive a receiver 10 into a false solution regarding the position of the receiver 10 or a local time at the receiver 10, each of which may be calculated based on received positioning system signals 32 at the receiver 10. As described above, in such a spoof attack, the spoofer 20 may generate a fraudulent signal 22 that is broadcast in such a manner that it is received at the antenna 12 of the receiver 10.

As further described above, the fraudulent signal 22 may be generated such that the detection of such a signal 22 as being fraudulent is difficult at the receiver 10. For instance, with reference to FIG. 2, an example of a representation of a positioning signal 32 is depicted. The horizontal axis may represent time and the vertical axis may represent the power of the received signal 32. In a normal operation context as depicted in FIG. 2, the positioning system signals 32 may be received at regular intervals in what may be referred to as a "fix." A fix may comprise receipt of at least one positioning system signal 32, although a plurality (e.g., four or more) positioning system signals 32 may be received. In the context of a stationary receiver 10, the positioning system signal 32, once acquired, may be tracked. In this regard, it is normally expected that any variation of the time at which the positioning system signal 32 is received may be due to a bias or error at the receiver 10 (e.g., a time error or bias), rather than from movement of the receiver 10.

However, with further reference to FIG. 3, a scenario is depicted in which a fraudulent or spoofed signal 22 is introduced. As may be appreciated in FIG. 3, at an initial time $T_1$, the fraudulent signal 22 may replicate an authentic signal 32, although be at a higher power than the authentic signal 32. In this regard, the receiver 10 may begin to track the fraudulent signal 22. Initially, there may be no change to a resulting solution derived by the receiver 10 using the fraudulent signal 22 due to the fact that the fraudulent signal 22 may, at least initially, be a replica of the authentic signal 32. However, as can be appreciated in time periods $T_2$ and $T_3$, the fraudulent signal 22 at the higher power than the authentic signal 32 may be manipulated to diverge from the authentic signal 32. In this regard, a resulting solution derived by the receiver 10 utilizing the fraudulent signal 22 may be inaccurate. For instance, either the resulting position and/or time calculated by the receiver 10 may be modified based on the spoofer's manipulation of the fraudulent signal 22.

Figure 4:
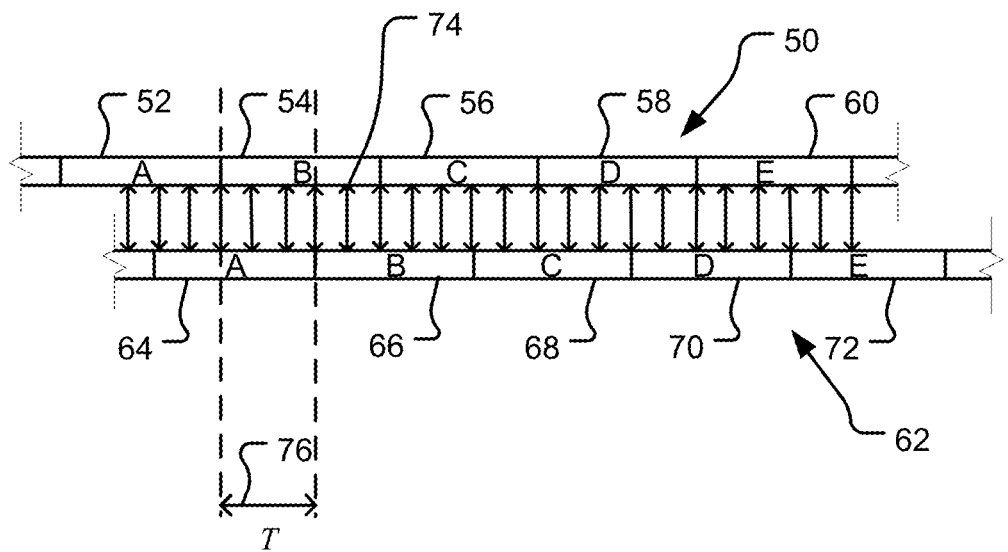
FIG. 4 depicts an embodiment of a correlation process for identification of a signal at a receiver.

With further reference to FIG. 4, a representation of a correlation process that may be performed by a positioning system receiver to detect a positioning system signal at the receiver is shown. In FIG. 3, a received signal 50 (e.g., corresponding to a positioning system signal 32 such as a GNSS pseudorandom code (PRN)) is represented by a plurality of code chips including chip A 52, chip B 54, chip C 56, chip D 58, and chip E 60. Each chip of the received signal 50 is representative of a bit in the received signal 50 as received at the receiver. The receiver may also generate a reference signal 62 that is a duplication of a known code signal (e.g., from published GNSS information, ephemeris/almanac data, assistance data, or the like). The reference signal 62 includes code chips that may include corresponding code chips to the received signal 50 comprising chip A 64, chip B 66, chip C 68, chip D 70, and chip E 72. In this regard, chip A 52 of the reference signal 50 may correspond with chip A 64 of the reference signal 62, chip B 54 of the received signal 50 may correspond with chip B 66 of the reference signal 62, chip C 56 of the received signal 50 may correspond with chip C 68 of the reference signal 62, chip D 58 of the received signal 50 may correspond with chip D 70 of the reference signal 62, and chip E 60 of the received signal 50 may correspond with chip E 72 of the reference signal 62.

In turn, the received signal 50 and reference signal 62 may be sampled at a number of digital sampling points 74 represented in FIG. 4 as arrows connecting the received signal 50 and the reference signal 62. A correlation offset 76 between the reference signal 62 and the received signal 50 may be modified in the time domain with a plurality of different code phase offsets. For each code phase offset, the correlation between the received signal 50 in the reference signal 62 is determined by performing a correlation between the sampling points 74 to determine a correlation value (i.e., a representation of how well the sampling points 74 correlate) between the received signal 50 in reference signal 62. The correlation between two signals may be expressed by a correlation value between 0 and 1. In turn, a complete correlation (i.e., when each sampling point 74 results in a complete correlation between the received signal 50 and reference signal 62) may result in a correlation value of 1. In contrast, if no sampling points 74 correlated, a correlation value of 0 would be returned indicating that none of the sampling points 74 agreed between the received signal 50 and reference signal 62. In turn, the correlation values may be plotted relative to different respective correlation offsets 76 to determine correlation peaks (i.e., phase offsets at which a correlation value peaks indicating agreement between the received signal 50 and the reference signal 62).

Figure 5:
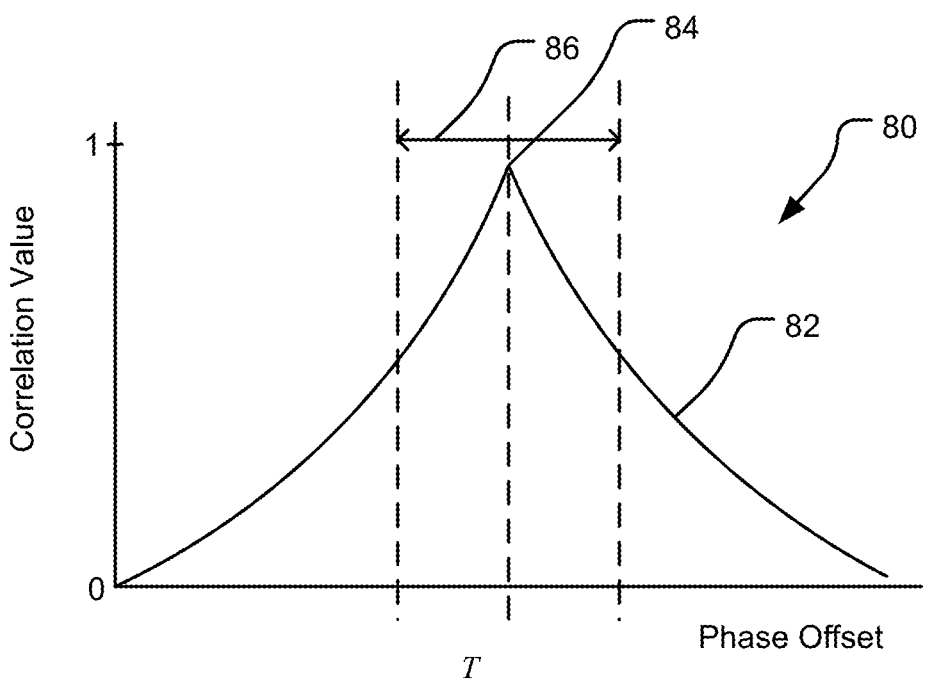
FIG. 5 depicts an embodiment of a correlation plot resulting from a correlation process as depicted in FIG. 4.

For instance, with further reference to FIG. 5, one such plot 80 of correlation values for the various code phase offsets (represented along the horizontal axis) is depicted. The vertical axis may be represented as a correlation value ranging between 0 (no correlation) and 1 (perfect correlation). The plot 80 includes a correlation curve 82. The vertical axis represents correlation values ranging from 0 to 1 and the horizontal axis represents the phase offset in increments represented in terms of chips. Accordingly, the correlation peak 84 in FIG. 5 may represent a phase offset 76 at which the received signal 50 and reference signal 62 correlate to the greatest degree. In non-idealized contexts, a received signal 50 originating from a positioning system transmitter requires some amount of time to travel between the positioning system transmitter and the receiver. In turn, the received signal 50 will be offset by some value from the reference signal 62. In turn, a correlation offset 76 that is nonzero may be determined that is representative of the time delay required for the received signal 50 to reach the receiver.

In addition, by searching over a plurality of correlation offsets 76, the phase of the received signal 50 may be determined. Specifically, a time search window 86 as shown in FIG. 5 may be defined over which various correlation offsets 76 are searched to determine correlation. The time search window 86 may initially be relatively broad during initial signal acquisition. However, once a correlation peak is identified (i.e., a signal is acquired), the time search window 86 may be significantly narrowed to track the acquired signal. That is, the time search window 86 may be narrowed around a previous signal fix for a subsequent signal fix with the assumption that the signal will continue to fall within the time search window 86 in the subsequent fix. This may allow for reduced computational overhead because the larger the search window is, the greater number of calculations are required to generate the correlation curve 82 within the time search window 86.

Figure 6:
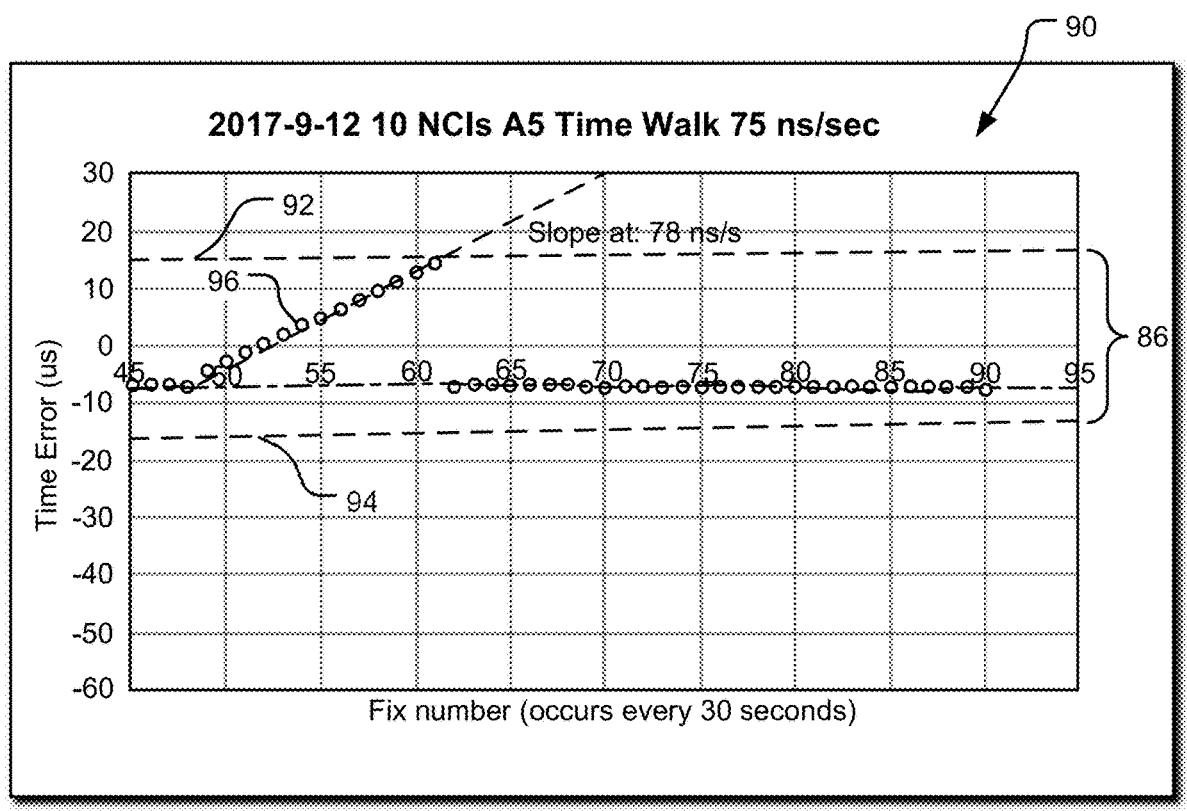
FIG. 6 is a graphical representation of an embodiment in which signals that exceed a bound on a time search window are disregarded at a receiver.

With further reference to FIG. 6, it has been recognized herein that the time search window 86 may also be used to reject or disregard fraudulent signals at the receiver. FIG. 6 depicts a plot 90 showing a plurality of signal fixes (i.e., signals identified as corresponding to a correlation peak within the time search window 86) plotted as fix plots 96. In turn, the horizontal axis in FIG. 6 represents the fix number. The vertical axis represents time. As can be appreciated, the time search window 86 appears in FIG. 6 as existing between an upper bound 92 and a lower bound 94. Accordingly, the vertical axis represents time with the zero value on the vertical axis corresponding to the correlation peak 84 for an initial fix. In the simulation used to generate FIG. 6, a received signal 50 was spoofed with the spoofed signal originally mimicking the authentic signal. The mimicked signal was broadcast at a higher power than the authentic signal. However, at some time after introduction of the mimicked, spoofed signal, the spoofed signal was intentionally modified at a rate of 78 ns/s in an attempt to deceive the receiver into tracking the spoofed signal. In reality, this could lead the receiver to using the spoofed or fraudulent signal to derive a solution (e.g., for time, position, or the like) that may be in error.

However, the receiver was configured to maintain the time search window 86 and review only valid signals within the time search window 86. As can be appreciated, as the fraudulent signal begins to "walk-off" from the authentic signal, the result is a slope in the fix plots 96 diverging from the authentic signal, which was maintained at the 0 time offset of the original fix. In this specific example, the time search window 86 was defined as +/−14 ns from the zero offset corresponding to the initial fix. Accordingly, it can be appreciated that the fraudulent signal's rate of change resulted in the divergence between the authentic signal and the spoofed signal such that the higher powered spoofed signal was tracked by the receiver, thus resulting in the fix plots 96 approaching the upper bound 92 of the time search window 86. However, as the fraudulent signal crosses the upper bound 92 of the time search window 86, the receiver no longer identifies the correlation peak for the fraudulent signal as it falls outside of the time search window 86. Thus, even though the fraudulent signal may be broadcast at a higher power than the authentic signal, once the fraudulent signal is walked out of the time search window 86 by the spoofed, the signal is no longer recognized as the highest correlation peak within the time search window 86. Rather, the authentic signal, which remains within the time search window 86 is again acquired and the resulting fix plots 96 again conform to the zero offset of the authentic signal. That is, the receiver is able to reject or disregard the fraudulent or spoofed signal once it is modified by the spoofer to fall out of the time search window 86 in the spoofer's attempt to deceive the receiver.

In the example depicted in FIG. 6, the receiver used to generate the plot data 90 utilized a highly stable Rubidium oscillator. Specifically, the Rubidium oscillator was used to drive the receiver's local clock signal relative to which the time search window 86 is defined. Due to the stability of the oscillator in this example, any error introduced into the signal based on oscillator drift may be ignored. However, in practical applications, most commercially feasible receivers do not include such a high precision oscillator due to the high cost of such oscillators. Accordingly, in most applications, the stability of the oscillator may not be as great as in the case using the Rubidium oscillator. Accordingly, a further complication is introduced in determining whether a signal drifts out of the time search window 86 due to manipulation of a fraudulent signal or due to error introduced into the receiver's time signal by oscillator error.

Many receivers address oscillator stability issues by error correcting the oscillator and/or time signal through discipline to an external time reference (e.g., GNSS time or UTC time). Such correction often is performed in connection with receipt of sufficient number of positioning system signals to allow for compensation and recovery of time errors (in phase and frequency) at the receiver. That is, the correction of the time signal of the receiver may be based on received positioning system signals. As may be appreciated, performing such an approach in the presence of a potentially fraudulent positioning system signal may result in the fraudulent signal being used to correct the time signal of the receiver such that the intentionally imposed drift of the fraudulent signal may not be discernable. Alternatively, receivers may synchronize to an external time reference using a timing protocol that is communicated to the receiver. However, such timing protocols may be difficult to implement unless network conditions are sufficiently stable to allow for reliable communication characteristics for the timing protocol. In short, the requirement to discipline the time signal of a local oscillator to account for time error introduced by drift of the local oscillator complicates the use of a time search window 86 to reject fraudulent signals.

Figure 7:
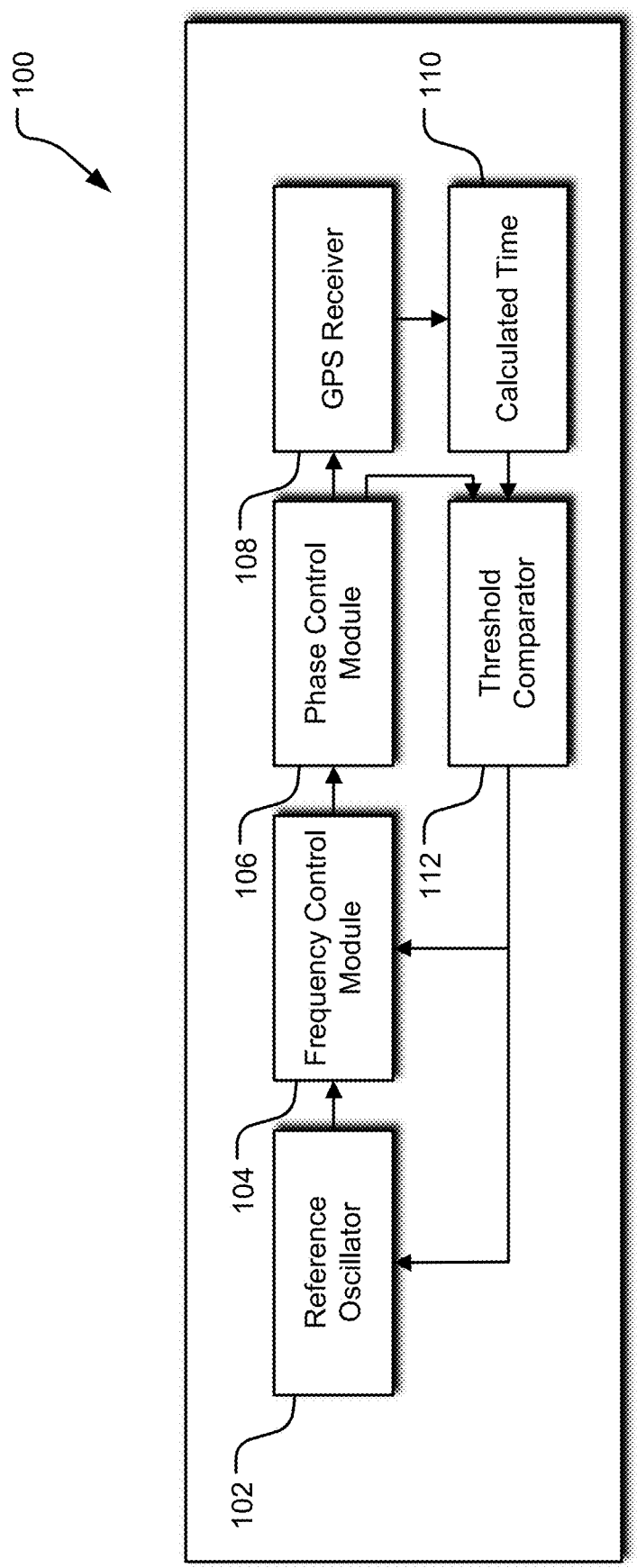
FIG. 7 depicts a schematic representation of an embodiment of a receiver for updating a time signal at a receiver to avoid acquiescing in a bias provided by a fraudulent signal.

Accordingly, a number of embodiments are described herein that allow for compensation of time errors introduced by local oscillator drift while allowing a receiver to reliably use a time search window 86 as described above to reject fraudulent signals that are manipulated beyond the time search window bounds. A first embodiment of a receiver 100 that addresses this issue is shown in FIG. 7. The receiver 100 may include a reference oscillator 102. As described above, the reference oscillator 102 may be of a grade commonly used in consumer receivers. In this regard, the reference oscillator 102 may be susceptible to drift of a magnitude that, if left uncorrected, could impede reception of positioning system signals. In this regard, the receiver 100 may include a frequency control module 104 and a phase control module 106 that may be operative to adjust a frequency and phase, respectively, of a timing signal of the receiver 100 based on the reference oscillator 102. In turn, the timing signal may provide a nominal time reference relative to the local time base of the receiver 100.

In addition, the receiver 100 may include a GPS receiver 108. The GPS receiver 108 may use the time signal provided as an output of the frequency control module 104 and the phase control module 106 in connection with reception of positioning system signals from one or more positioning system transmitters. In turn, the received positioning system signals may be used to generate a calculated time 110 that is provided to a threshold comparator 112. The threshold comparator 112 may be used to generate corrections that are provided to the frequency control module 104 and/or phase control module 106 for adjustment of the timing signal of the receiver 100 to be in synchronization with the calculated time 110 from the GPS signals received at the receiver 100.

However, it may be appreciated that in the presence of a fraudulent or spoofed signal, updating the time signal of the receiver 100 with the fraudulent signal as a basis of the calculated time 110 may allow the fraudulent signal to go undetected by adjusting the nominal time of the receiver using the fraudulent signal. Accordingly, the rate at which the threshold comparator 112 updates the time signal by adjusting the frequency control module 104 and/or phase control module 106 may be related to the anticipated rate at which a fraudulent signal is adjusted. That is, a spoofer may seek to modify the rate at which a fraudulent signal diverges from an authentic signal at a rate that avoids detection due to a large sudden change in the signal characteristic. However, the spoofer may not wish to modify the signal too slowly due to considerations regarding susceptibility of being detected and time considerations. As such, the rate at which a spoofer modifies a fraudulent signal may be predicted or anticipated to at least a reasonable estimate. In turn, the rate at which a receiver 100 updates the time signal may be related to the anticipated rate of change of the spoofed signal.

In this regard, the rate at which the receiver 100 updates the time signal may be based on the anticipated rate of change of a spoofed signal. Specifically, the rate of updating the time signal based on received positioning signals may be slower than the rate at which it is estimated that the fraudulent signal would cross a bound of the time search window 86. In this regard, the rate at which the time signal is updated may also be at least in on the size of the time search window 86. The update rate for the time signal based on received positioning system signals may be sufficiently slow such that a fraudulent signal crosses the bound of the time search window 86 prior to updating the time signal, thus eliminating the fraudulent signal from consideration. Further still, the rate at which the time base of the receiver 100 is updated may be at least in part based on the stability of the reference oscillator 102 (e.g., based on the Allan variance thereof).

Figure 8:
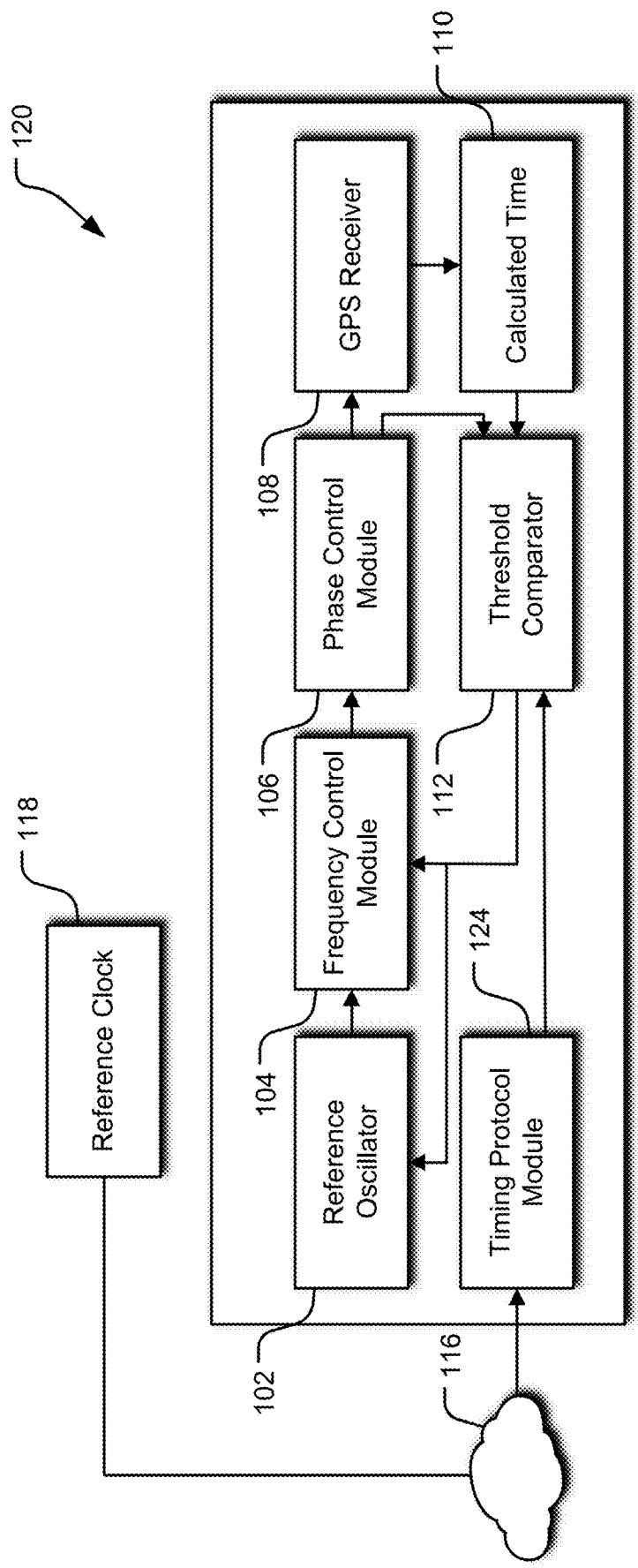
FIG. 8 depicts a schematic representation of another embodiment of a receiver for updating a time signal at a receiver to avoid acquiescing in a bias provided by a fraudulent signal.

In an alternative approach to disciplining a receiver's time signal to an external time reference, a timing protocol may be communicated to a receiver. In at least one embodiment, such a timing protocol may be communicated using an asynchronous packet-switched internet protocol network such as the Internet. An embodiment of such a receiver 120 is depicted in FIG. 8. The receiver 120 may include a reference oscillator 102, phase control module 104, a frequency control module 106, a GPS receiver 108, and a calculated time 110 that all generally operate as described above in relation to the receiver 100 shown and described in relation to FIG. 7.

However, the receiver 120 may also have a timing protocol module 114. The timing protocol module 114 may be in operative communication with a communication network 116 (e.g., the Internet). Specifically, the communication network 116 may facilitate communication between the timing protocol module 114 and a reference clock 118 remote from the receiver 120. The reference clock 118 may be synchronized to the positioning system time base. In turn, the reference clock 118 may communicate with the timing protocol module 114 using a timing protocol that allows the timing protocol module 116 to derive a time and frequency related to the time base of the reference clock 118. As may be appreciated, the communication over the communication network 116 may be protected (e.g., encrypted) such that the timing protocol used to establish a time and frequency at the timing protocol module 114 may be trusted. In turn, the time and frequency at the timing protocol module 114 may be compared to the calculated time 110 to determine a discrepancy, thus indicating that a fraudulent positioning system signal may have been received at the GPS receiver 108. In the absence of a spoofed signal, the calculated time 110 may be used in conjunction with the timing protocol module 114 to update the time signal by adjusting the frequency control module 104 and the phase control module 106. In addition, the time signal used to receive GPS signals may be based on the time base of the timing protocol module 114, such that the operation of the GPS receiver is based on the external time base.

Figure 9:
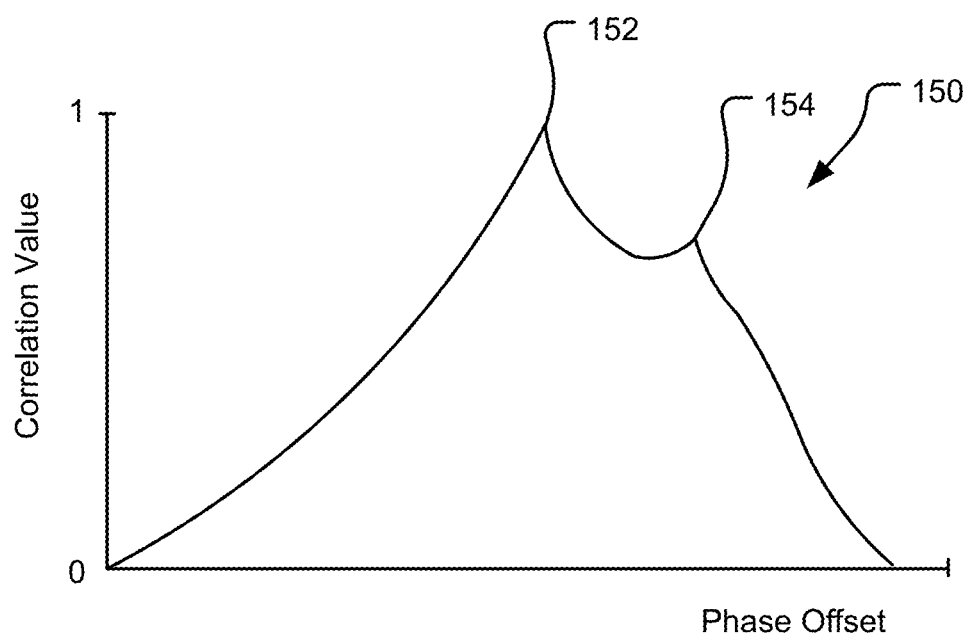
FIG. 9 depicts an example correlation plot having alternative correlation peaks corresponding to candidate signals.

Another approach that may be utilized by a receiver 10 may include rejection of a fraudulent signal 22 even if the signal 22 has not yet exceeded the bounds of a time search window 86. In this approach, a receiver 10 may check the Doppler offset of the peaks into the threshold calculations. That is, as further depicted in FIG. 9, a plot 150 of the correlation of signals received at the receiver 10 is depicted. As may be appreciated, plot 150 in FIG. 9 may represent a given Doppler bin, wherein a number of correlation peaks 152 and 154 may be identified. While correlation peak 152 demonstrates a higher correlation than peak 154, each of the correlation peaks 152 and 154 may be identified as potentially belonging to candidate signals. In this regard, the candidate signals may be used to calculate a solution at the receiver 10 and the candidate signals may be evaluated to determine a consistency for the resulting solution. For instance, in the event of a stationary receiver 10, any resulting solution that would result in the receiver 10 moving from an a priori location, may be determined to be inconsistent. For instance, such a solution may be derived using the candidate signal corresponding to correlation peak 152. In contrast, if a solution derived using the candidate signal for the correlation peak 154 provides a consistent solution (e.g., showing no motion in the receiver 10) between fixes, the lower correlation peak 154 may be identified as corresponding to the authentic signal 32, and thus the higher correlation peak 152 and the candidate signal related thereto may be dismissed.

Figure 12:
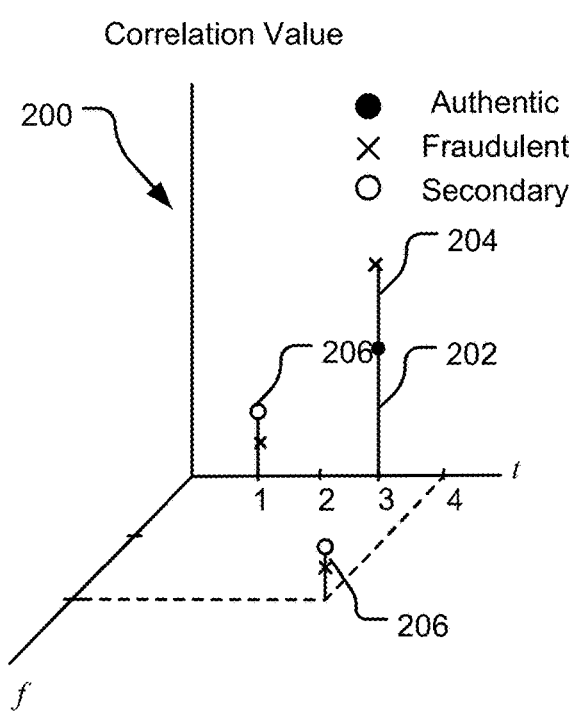
FIGS. 12 and 13 depict embodiments of plots showing received signals in a respective Doppler bin.

Yet another approach that may allow for detection of fraudulent signals that have not yet exceeded the bounds of a time search window 86 may also involve investigation of primary and secondary signals identified in a respective Doppler bin of a receiver. With further reference to FIG. 12, a plot 200 depicts received signals in a given Doppler bin received at the receiver. The plot 200 includes a frequency axis, a time bin axis, and a vertical correlation window axis. The plot 200 represents a first time, in which an authentic signal 202 and a fraudulent signal 204 are received. As can be appreciated, at the first time, the authentic signal 202 and the fraudulent signal 204 may agree with respect to the time bin and frequency of the respective signal, understanding that a spoofer may originally replicate an authentic signal 202 at a greater power as described above. This explains the fact that the fraudulent signal 204 has a higher correlation than the authentic signal 202. A number of secondary signals 206 are also shown that may represent correlation peaks within the Doppler bin depicted in the plot 200.

As may be appreciated in FIG. 12, which includes a plot 210 depicting a second time subsequent to the first time, the fraudulent signal 204 may "walk" relative to the time bin of the authentic signal 202. As the fraudulent signal 204 may be broadcast at a higher power than the authentic signal 202, the receiver may track the fraudulent signal 204 as described above. As may be appreciated, the frequencies of the authentic signal 202 and the fraudulent signal 204 may remain the same, such that a spoofer may target spoofing the receiver's time. That is, a spoofer may generate signals that would otherwise render a position solution for a stationary receiver that is accurate. However, the spoofer may broadcast the fraudulent signal 204 (or a plurality of fraudulent signals 204) to influence the receiver's time base to a fraudulent value.

However, for a stationary receiver with a relatively narrow Doppler bin spacing (e.g., 0.25 Hz), it has been recognized that it may be possible to accurately calculate the stationary receiver's local oscillator frequency error relative to the receiver's nominal tuned time base using either the fraudulent signal 204 or the authentic signal 202. That is, the recovered Doppler error may be the same for both the authentic signal 202 and the fraudulent signal 204.

Figure 13:
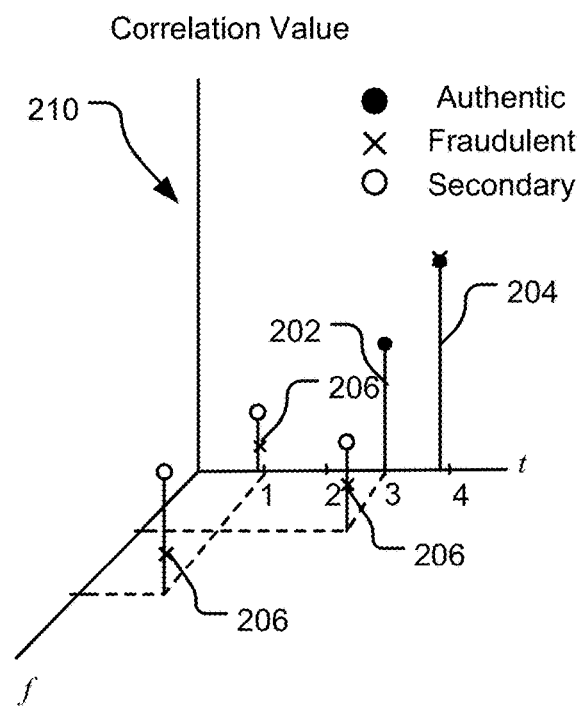
Figure 14:
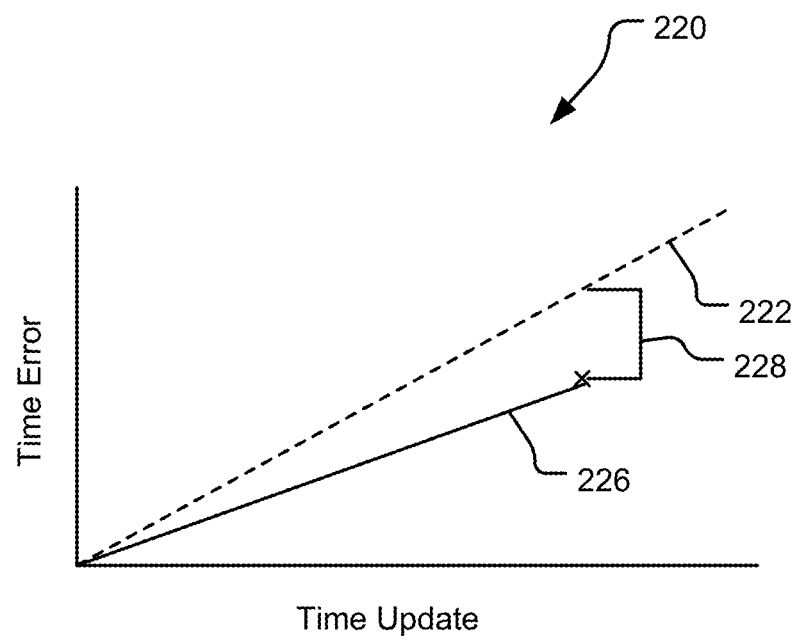
FIGS. 14 and 15 depict embodiments of plots showing a predicted time phase shift in a received signal for an authentic signal versus a potentially fraudulent signal.
Figure 15:
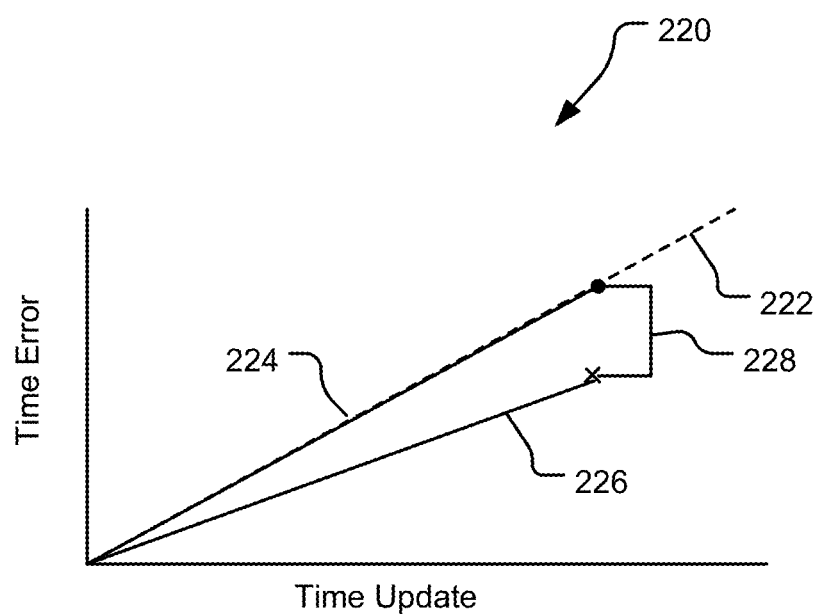

Accordingly, the receiver may, over time, be operative to determine that a phase correction to the time base of the receiver may not correspond to an expected value based on the recovered oscillator error. This is further demonstrated in FIG. 14. FIG. 14 includes a plot 220 whose horizontal axis represents the time between clock recoveries and the vertical axis represents the resulting time error (e.g., the amount of phase offset required to correct the receiver time base). As frequency is recovered using either the authentic signal 202 or the fraudulent signal 204, the determined value for the frequency error of the local oscillator may be plotted as the expected time profile 222 shown in dotted line in FIG. 14. That is, the frequency error may be represented by the slope of the time profiles in the plot 220 such that for a given frequency error determined during frequency recovery, an expected time offset value may be derived based on the frequency error and the time since the last time base update. As shown, a fraudulent signal 204 may have a time profile 226 that varies from the expected time profile 222 given the frequency error recovered at the receiver and the time since the last recovery. The resultant time error offset 228 represented by the difference in time error between the expected time profile 222 and the fraudulent time profile 224 may indicate that one of the signals is fraudulent. If this occurs, alternate candidate signals from the Doppler bin may be analyzed. In this regard, with returned reference to FIG. 13, the authentic signal 202 and/or secondary signals 206 may also be analyzed to determine whether these candidate signals agree with respects to the amount of phase offset expected based on the expected time profile 222. For instance, in FIG. 15, a time profile 224 for the authentic signal 202 may be plotted relative to the expected time profile 222. As can be appreciated, the authentic signal 202 may provide a time profile 224 that corresponds to the expected time profile 222 much more than the time profile 226 for the fraudulent signal 204. As such, after triggering the examination of the secondary correlation peaks in the Doppler bin, it may be determined that a secondary peak (i.e., the authentic signal 202) may provide self-consistency with respect to the expected time base phase offset given a recovered frequency error. In the event that on one of the secondary peak is consistent with the expected time profile 222, then the primary peak may be rejected as fraudulent and the secondary signal accepted as authentic.

Figure 10:
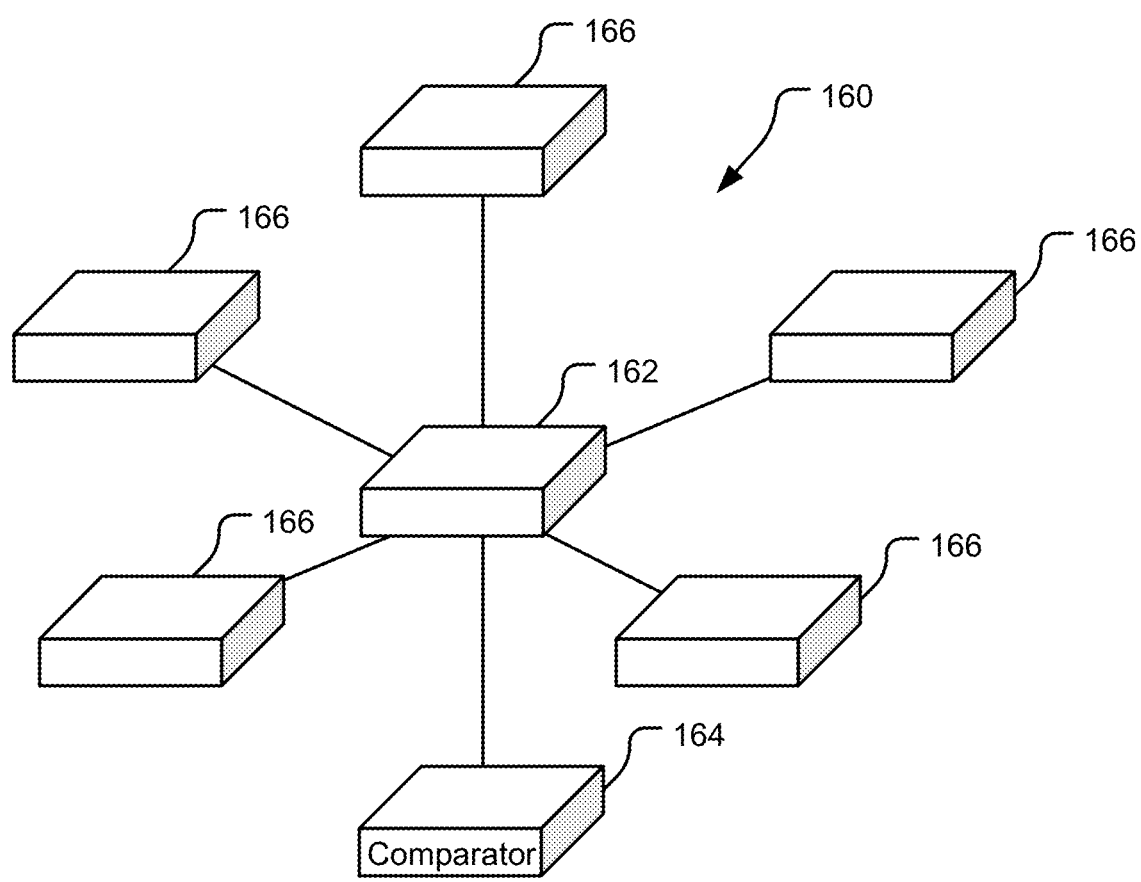
FIG. 10 depicts an embodiment of a networked approach to fraudulent signal detection.
Figure 11:
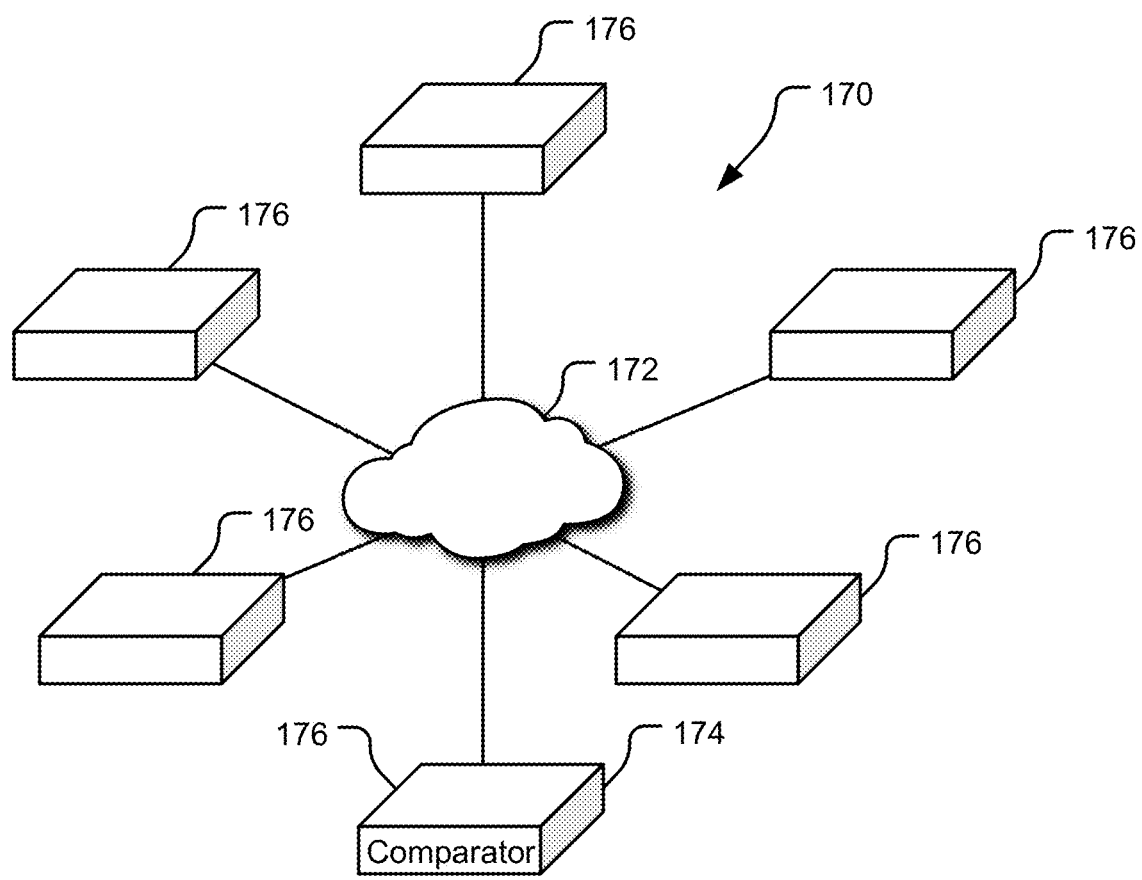
FIG. 11 depicts another embodiment of a networked approach to fraudulent signal detection.

Turning to FIGS. 10 and 11, embodiments that utilize networked communication among receivers for assistance in identifying fraudulent signals 22 is shown as systems 160 and system 170. In system 160, a plurality of receivers 166 may be in operative communication by way of a local area network (LAN) controller 162. The system 160 may also include a comparator 164. In this regard, each receiver 166 may provide received positioning system signals by way of the LAN controller 162 to the comparator 164. In this system, by use of the LAN controller 162, the receivers 166 may be relatively geographically dispersed at a given facility. For instance, the receivers 166 may have a separation of at least about 30 m between each receiver 166. The separation between adjacent receivers 166 may not be greater than about 150 m.

In turn, it may be that some receivers 166 may receive fraudulent signals 22 while other receivers 166 may not. In turn, the comparator 164, when analyzing the signals provided by each receiver 166 may be able to identify inconsistencies amongst the signals provided due to the presence of a fraudulent signal 22 in at least one of the signals provided by the receivers 166. For instance, the comparator 164 may be operative to compare a characteristic corresponding to each receiver 166 to determine whether one of the receivers is receiving a fraudulent signal 22. For instance, the characteristic may comprise a phase of the signals received at the receivers 166 such that the comparator 164 may identify a disagreement in phase amongst the signals, thus resulting in an alarm or other action, which will be described in greater detail below. In other embodiments, the characteristic compared by the comparator 164 may comprise a time base calculated by each corresponding one of the receivers 166. In turn, the comparator 164 may be operative to compare the time basis for each corresponding one of the receivers 166 to determine anomaly. Furthermore, the comparator 166 may receive a universal positioning system time base as a reference to compare the time base from each receiver 166 to determine an anomaly. For instance, the comparator 166 may receive the universal positioning system time base via a communication network such as the Internet. An embodiment, the universal positioning system time base may correspond to UTC utilized by GPS.

FIG. 11 provides a similar arrangement as that depicted in FIG. 10, with the exception that the receivers 176 in FIG. 10 may be in operative communication over a wide area network (WAN) 172 such as the Internet. In turn, the comparator 174 may function in the same manner as the comparator 164, with the exception that the comparator 174 may receive the signals from the receivers 176 by way of the WAN 172 rather than via a LAN controller 162. In turn, use of the WAN may allow the receivers 176 to be more widely distributed, thus potentially allowing more separation between receivers. In this regard, the likelihood that a spoofer would be able to provide fraudulent signals 22 to each of the receivers is decreased. However, the separation distance between receivers may be relatively close enough such that the receivers 176 may each receive signals from common positioning system transmitters 30. Examples of separation distances in the arrangement of FIG. 11 may be not less than about less than about 1 km, yet sufficiently close to ensure that receivers 176 receive signals from common transmitters.

In either of the foregoing systems 160/170, in the event the comparator 164/174 determines that there is an inconsistency that indicates the presence of a fraudulent signal 22, a number of actions may take place. For example, an alert or alarm may be provided that indicates the presence of a spoof attack. The alert or alarm may be shared among the networked receivers 166/176 or may be shared beyond the networked receivers. In this regard, the alert or alarm may be provided to other receivers outside the respective network used to generate the alert or alarm and/or the alert may be provided to appropriate authorities such as law enforcement to allow for investigation and/or intervention related to the spoofing.

In addition, the systems 160/170, upon detection of conditions consistent with a fraudulent signal 22 being present, may initiate procedures such as those described above such that candidate signals may be provided for testing to determine if alternative correlation peaks may correspond to a candidate signal that resolves the inconsistency (e.g., provides assurance of an authentic signal). In this regard, at least some of the receivers 166/176 in the system may be assumed to be stationary to assist in reducing sources of bias or error that may otherwise contribute to inconsistencies in the signals. As such, a search for a solution using the available candidate signals may be conducted to determine authentic signals from the candidate signals provided for evaluation.

In this regard, the receivers 166/176 may be referred to as sentry receivers in that they may, individually or collectively, be able to detect and alert to the presence of a fraudulent signal. As described above, this alert may be provided to other receivers (e.g., even mobile receivers in the area of the system 160/170). Accordingly, the use of such sentry receivers may allow for provision of a trusted network that allows for reliable time and/or position determination with confidence that signals are not being spoofed. In this regard, networks of sentry receivers may be established in various areas to help assist in detecting and/or deterring spoof attacks.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for rejecting at least one falsified positioning system signal at a receiver, comprising:
    acquiring at least a first positioning system signal at the receiver, wherein the first position system signal is acquired based on a time search window defined relative to a time signal at the receiver, wherein the first positioning system signal generates a correlation peak within the time search window;
    maintaining a correspondence of the time search window to the time signal for a time period that exceeds an expected rate of drift of a typical falsified positioning system signal;
    rejecting at least a second positioning system signal subsequently acquired at the receiver as a falsified positioning system signal based upon the falsified positioning system signal drifting outside of the time search window relative to the time signal and without reference to an alternate time signal associated with the second positioning system signal; and
    maintaining acquisition of the first positioning signal during the time period.

2. The method of claim 1, further comprising:
    accessing an assumed-correct time signal at the receiver corresponding to a first time base, wherein the assumed-correct time signal is defined relative to the first time base; and
    adjusting the time signal using the assumed correct time signal to reduce time error.

3. The method of claim 2, wherein the assumed-correct time signal is accessed from a locally maintained nominal time reference at the receiver.

4. The method of claim 3, further comprising:
    initializing the locally maintained nominal time reference at a first time by synchronization of the locally maintained nominal time reference relative to a positioning system time base.

5. The method of claim 4, wherein the initializing comprises synchronization of the locally maintained nominal time reference using initial positioning system signals acquired at the first time, wherein the initial positioning system signals are assumed to be authentic.

6. The method of claim 4, further comprising:
    updating the locally maintained nominal time reference at a second time subsequent to the first time by synchronization of the locally maintained nominal time reference based on positioning system signals from the acquiring of the at least first positioning system signal at the receiver based on the time search window defined relative to the assumed-correct time signal.

7. The method of claim 6, wherein the updating occurs less frequently than the acquiring.

8. The method of claim 7, wherein the updating occurs at a rate that is lower than the expected rate of drift of the typical falsified positioning system signal.

9. The method of claim 2, wherein the assumed-correct time signal comprises an external time reference received at the receiver from a location remote from the receiver.

10. The method of claim 9, wherein the external time reference corresponds to a positioning system time of a positioning system that generates the positioning system signal.

11. The method of claim 10, further comprising:
obtaining the external time reference based on a protocol communicated to the receiver over an asynchronous packet-switched internet protocol network.

12. The method of claim 11, further comprising:
deriving a calculated time signal from the at least first positioning system signal; and
comparing the calculated time signal to the external time reference.

13. The method of claim 12, wherein the comparing is used to determine whether the at least first positioning system signal is authentic.

14. The method of claim 12, wherein the comparing is used to provide a correction to the external time reference.

* * * * *